United States Patent [19]

Butz

[11] 4,236,060
[45] Nov. 25, 1980

[54] APPARATUS FOR WELDING A BASIN TO A FRAME

[75] Inventor: Otmar Butz, Sackingen, Fed. Rep. of Germany

[73] Assignee: Niro-Plan AG, Schweiz, Fed. Rep. of Germany

[21] Appl. No.: 149

[22] Filed: Jan. 2, 1979

[30] Foreign Application Priority Data

Dec. 31, 1977 [DE] Fed. Rep. of Germany ....... 2759173

[51] Int. Cl.³ .............................................. B23K 9/225
[52] U.S. Cl. ............................ 219/125.1; 219/125.11; 219/158
[58] Field of Search ................. 219/125.1, 125.11, 158

[56] References Cited

U.S. PATENT DOCUMENTS

| | | | |
|---|---|---|---|
| 1,807,971 | 6/1931 | Dau | 219/158 X |
| 2,903,566 | 9/1959 | Launder | 219/125.1 |

*Primary Examiner*—E. A. Goldberg

*Attorney, Agent, or Firm*—Craig and Antonelli

[57] ABSTRACT

A method for connecting at least one basin of metal sheet to a basin opening of a frame formed of metal sheet by positioning a metal basin with its rim surrounding a basin opening of the frame so that the edge of the opening projects inwardly beyond the rim of the basin and melting this projecting rim by welding without employing additional work material. According to a preferred embodiment, this method is performed by apparatus having a presser plate displaceably mounted on a machine frame, a plunger on a lower end of the frame for centering the basin and basin opening, presser ring attached to the upper end of the cross-head that forms a gap with respect to an upper edge of a basin holder of the presser plate and the plunger necessary for effectuating welding of the basin to the frame, and at least one welding torch mounted so as to be displaceable along a guide track with its nozzle directed at a constant setting angle toward the gap between the plunger and the presser ring.

26 Claims, 13 Drawing Figures

APPARATUS FOR WELDING A BASIN TO A FRAME

BACKGROUND AND SUMMARY OF THE INVENTION

The invention relates to a method of connecting, without a visible seam, at least one basin deep-drawn from a metal sheet, to the basin opening of a frame consisting of sheet metal, for example, the basin opening of a cover plate formed from a stainless steel plate, of a kitchen sink unit or the like, by the employment of at least one welding process, wherein, starting from the upper edge of its vertical wall, the basin comprises a surrounding rim which is connected to said wall by an arcuate portion which is located below the rim of the basin opening, wherein furthermore, a free edge of the rim of the basin opening projects beyond the basin rim in the direction of the center of the basin prior to the completion of the entire work process.

For the purpose of simplification, reference is made below merely to a cover plate for a stainless steel sink unit with one or more basins, without the subject matter concerned being limited thereby.

Based upon the method referred to above, the procedure in respect of such cover plates has been heretofore that first the rims of the basins are connected by spot welding to the rim of the basin opening of the cover plate, in order to adjust the two parts relatively to each other and to fix them preliminarily. Thereafter, the two parts are finally connected together by a continuous roll seam welding process. This is followed by a further operating step in which the free edge which projects in the direction of the basin center, of the rim of the basin opening of the cover plate is ground off, so that a smooth transit is obtained between the basin and the cover plate. Finally, the grinding marks extending along the weld seam are removed by polishing in order to give the article consisting of the cover plate and the basin, its finished appearance.

The procedure described above is relatively complicated, time consuming and expensive in every respect. First of all, the spot-like welding connection between the cover plate and the basin requires a spot welding machine and appropriate apparatus for mutual centering of cover plate and basin. Then the roll seam welding process requires a further appropriate machine in which the unit to be treated again must be held and guided by corresponding tools. Thereupon, changeover of the article to be manufactured is required to a grinding machine which is specially arranged therefor, and finally the same applies once again for the polishing process which terminates the production. Thus, altogether four work places with the machines associated therewith as well as the associated operator for welding a basin into a cover plate must be held in readiness. Beyond this, grinding away the projecting rim of the basin opening of the cover plate causes an unnecessary loss of material.

It is also known already to produce the basin and the cover plate in one piece in the way that the basin or basins are produced by deep-drawing from the material forming the cover plate. However, this necessitates a special production method which comprises several steps and which is characterized above all by the extremely high costs of the deep-drawing tools; moreover, these deep-drawing tools are usable always for only one type or for one size, and there is thus no flexibility in respect to different types or sizes, unless a plurality of sets of these very expensive tools are kept in stock.

It is an object of the invention to simplify considerably the production method described above and thereby to render the production more economical and more rapid, the expenditure for machines and apparatus being considerably reduced at the same time and yet the possibility being provided for change-over to different types or sizes of the construction units to be produced, in a simple way.

This problem is solved by a preferred method according to the invention in that the projecting portion of the free edge of the basin opening is united by melting with the arcuate portion between the verticl wall of the basin and the horizontal rim thereof, by using the rare gas electric arc welding method without the addition of work material.

By means of these measures in accordance with the invention welding of the basin into the cover plate together with mutual centering of these two parts takes place in a single operating step to such an extent that an outwardly smoothly rounded connection between these two parts is obtained which has been found not to require as a rule any after treatment by means of polishing. Therefore, basically one work place with the associated machine and the appropriate operator is sufficient for finally producing the unit consisting of plate and basin, and automation to the fullest extent is possible with multi-machine operation as far even as fully automatic production. Moreover, the rim projecting towards the basin center, of the basin opening of the cover plate can now be utilized without loss in respect of its material, in that it is united by melting with the material of the basin to be welded, whereby the surrounding rim of the basin to be welded may be rendered narrower and a corresponding saving of material is obtained.

However, it is essential above all that compared with the method initially described, the production is not only simplified and more economical, but also is considerably increased in respect of speed.

The rare gas electric arc welding method to be particularly considered may be, to name an example only, the TIG plasma welding method (tungsten inert gas welding method with pilot arc).

Apparatus for performing the method according to the invention is particularly characterized by a machine frame having vertical guides which are connected together at the top and at the bottom by a respective cross-head, a presser plate displaceable on the guides and having fixed thereon a holder for inserting therein from above the basin to be welded, a yoke located on the upper cross-head, a support column which extends vertically downwardly from the yoke, is centrally disposed relatively to the basin holder and penetrates through an opening of the upper cross-head, a plunger for mutually centering the basin and the basin opening for the welding process, the plunger being arranged at the lower end of the support column and its peripheral contour corresponding to the inner cross-section of the basin as well as the basin opening of the frame, a presser ring which is attached to the underside of the upper cross-head, the lower end face of which is flush with the upper rim of the basin holder and the said end face of which is set back relatively to the end face of the plunger, and which surrounds the plunger equidistantly at a spacing required for the welding process, a guide track equidistantly surrounding the support column relative to the peripheral contour of the plunger above the upper cross-head, as well as at least one welding torch which is displaceable along the guide track and the torch nozzle of which is directed at a constant setting angle to the gap between the plunger and the presser ring.

This apparatus permits the basin to be welded to be inserted into the basin holder and to displace it together therewith upwardly against the presser ring with which the cover plate is already in abutment, having been centered by the plunger. Thereafter, the welding torch travels around and welds together the two parts referred to, at the same time melting away the rim projecting towards the basin center, of the basin opening of the cover plate, the radius remaining constant, whereby the entire process of connecting the cover plate and the basin is already finished. This must be followed only in rare individual cases by a polishing process, in order to remove perhaps any minor discolorations of the material caused by the welding.

The apparatus according to the invention is suitable fundamentally for continuous contours relative to which the torch is displaced substantially horizontally. Just as well, however, vertical adjustments of the torch may be produced during the welding process by appropriate configuration of the guide track and/or the arrangement of the torch on the torch carriage, for example, in order to weld a contour which narrows downwardly relatively to the upper rim of the basin to form an overflow or the like.

The constant setting of the torch in the direction of the welding location is important in respect of the setting angle relatively to the vertical as well as also to the effect that the torch is positioned always perpendicular to the tangent to the contour to be welded.

It has been found advantageous for the said apparatus that the vertical guide comprises four guide columns which connect the cross-heads together and on which the presser plate is displaceable by means of guide bushes fixed to the latter. In this case, the vertical displacement of the pressure plate, and thus the basin holder, may be effected by means of a cylinder-piston unit which is attached to the lower cross-head and the piston rod of which extends through an opening of the cross-head and is connected to the underside of the presser plate.

The basin holder may be constructed as a hollow cylinder the inner cross-section of which corresponds to the outer cross-section of the basin and the upper rim of which is engaged by the horizontal rim of the basin. Also, the basin holder may be releasably and thus interchangeably attached to the presser plate. The same applies to the plunger and the guide track as well as the presser ring, whereby the apparatus may be converted to different basin sizes to be welded by the interchange of only a few parts which do not constitute an excessive cost factor.

In a further embodiment of the apparatus for performing the method according to the invention, it may be provided that the plunger comprises along its peripheral contour a plurality of centering pins for the basin opening which project, under the effect of springs, horizontally beyond the peripheral contour, and that the centering pins may be pushed back against the effect of the springs into the peripheral contour of the plunger. Thereby, a clean centering of the basin opening of the frame may be obtained in a simple manner prior to the welding process.

Furthermore, in this context, the peripheral contour of the plunger may be formed at least partly by horizontally displaceable segments, and in this case, with the basin displaced high upon the plunger, the segments may be extendable against a spring force to their nominal position for the purpose of forming the peripheral contour of the plunger. The latter may be effected in that the segments are supported at least indirectly under the spring force on an actuating member which is vertically displaceable in the center of the guide column and the plunger and that the support surface of the actuating member is a cone. The centering pins referred to may then be disposed in the segments. These measures render it possible to adjust the basin contour additionally in a positive manner prior to the final clamping for performing the welding process.

In the further developed apparatus described above for performing the method according to the invention, it is furthermore advantageous that, starting from its secure counter-bearing at the upper cross-head for the welding process, the presser ring is vertically downwardly displaceable by a fixed amount for the force exerted upon it by the basin holder, in which case the displacement of the presser ring may occur under its inherent weight and wherein, in the rigid counter-bearing position of the presser ring, the lower edge thereof may be located above the upper edge of the centering pins and the segments. Thereby, it is possible to lift the region to be welded above the upper edge of the centering pins and the segments together with the final clamping of cover plate and basin for the welding process, and thereby to get clear of these tools.

It is advantageous that the transit between the inner cross-section and the upper edge of the basin holder comprises a bevel and thus spacing relatively to the material of the basin to be welded, in the region of the weld seam. Owing to this phasing-in of the lower tool the melting away process at the weld seam can be controlled in a particularly simple manner, because the material melts away downwardly and has been given space thereby the bevel.

Moreover, it is advantageous that the guide track comprises for the welding torch an external surrounding toothed crown, a roller chain or the like, that the pinion of the motor drive for the welding torch is in driving connection therewith, and that the motor drive as well as the welding torch are attached to a torch carriage which is guided by the guide track vertically and radially in respect of the basin contour with a constant setting angle. Also, the motor drive of the welding torch may be controllable in a stepless manner.

Furthermore, it is advantageous that the radial guide for the welding torch consists of a surrounding rail of the guide track which extends vertically upwardly, and such a rail which extends vertically upwardly, and such a rail which extends vertically downwardly, that the torch carriage is guided at the upper rail on the outside by the pinion of the drive and on the inside by a securely adjustable roller, and that the torch carriage is guided at the lower rail on the outside by a securely adjustable roller and on the inside by radially resilient rollers which permit an adjustment of the torch corresponding to the basin radii.

In another constructional form, the torch carriage is radially and vertically guided by a surrounding vertical rail, the torch carriage is guided at the upper end of the rail on the inside by a securely adjustable roller and vertically by two downwardly resiliently mounted rollers as well as at the lower end of the rail on the outside by a securely adjustable roller and on the inside by two resiliently mounted rollers as well as vertically by two support rollers with a circumferential groove embracing the lower end of the rail, the support rollers are commonly axially displaceably mounted in a bogic which is rotatable about a vertical axis on the torch carriage, the inwardly located substantially radial edge of the circumferential groove of the support rollers is bevelled in the manner of a rail wheel, and the torch is connected to the rotary bogie or the axis of rotation thereof.

Finally, it has been found to be particularly advantageous that always two displaceable torches are provided which are displaceable through an arc of 180°. Thereby, the welding speed is doubled, in that two torches travel substantially through only half the arc to be welded altogether and are then stopped. After the next following workpiece has been inserted, the torches can then be returned in the welding work process.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 8 and FIG. 8a are a further development of the tools of the apparatus according to FIG. 3;

DETAILED DESCRIPTION OF THE PREFERRED EMBODIMENTS

Figure 1:
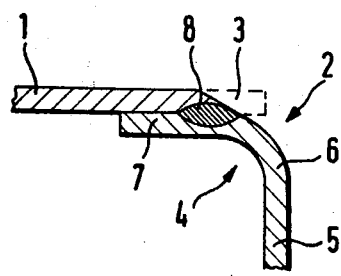
FIG. 1 shows the connection region between the cover plate and the basin in accordance with the known welding method.

FIG. 1 illustrates, in partial view and in section a cover plate 1 for a kitchen sink unit with a basin opening 2 and a free edge 3 of the rim of the basin opening. A basin 4 with a vertical wall 5 and a surrounding horizontal rim 7 connected thereto by an arcuate portion 6 is placed under the rim of the basin opening 2 and welded together at 8 with the cover plate 1, the arrangement being made so that the edge 3 projects freely in the direction of the interior of the basin. The cover plate 1 and the basin 4 consist of stainless steel.

The method for the welded connection of the two parts referred to is so performed in the known case that first the cover plate 1 and the basin 4 are connected one to the other by spot welding. Therafter, the weld seam 8 is produced by roll seam welding. Thereupon, the free edge 3 in respect of the piece drawn with a broken line is ground away, and finally the surface thus obtained is polished.

The method according to the invention is explained with reference to FIG. 2. There are found here again a cover plate 10 with a basin opening 11 and a free edge 12 as well as a basin 13 with a vertical wall 14, arcuate transit 15, a surrounding horizontal rim 16 connected thereto and a weld seam 17.

In accordance with the method according to the invention, the two parts 10 and 13 referred to are again placed one against the other in a centered manner by means of the apparatus still to be described. Thereupon, the free edge 12 is melted away by rare gas electric arc welding without additional work material and thereby welded to the basin 13 for example in the region of the arcuate transit 15. Thereupon, it may perhaps be necessary still to polish the weld seam.

Figure 2:
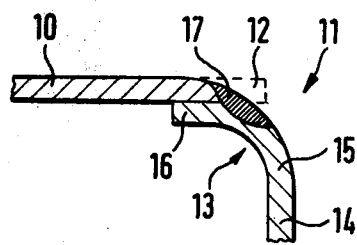
FIG. 2 shows the connection region between the cover plate and the basin according to the welding method in accordance with the invention.

As may be seen from FIG. 2, owing to the welding method according to the invention, a uniformly rounded transition is obtained between the cover plate 10 and the basin 13, and moreover, the weld seam 17 can be located closer to the center of the basin, so that the surrounding rim 16 may be kept narrower than had been possible for the corresponding rim 7 of the prior art method (FIG. 1).

Figure 3:
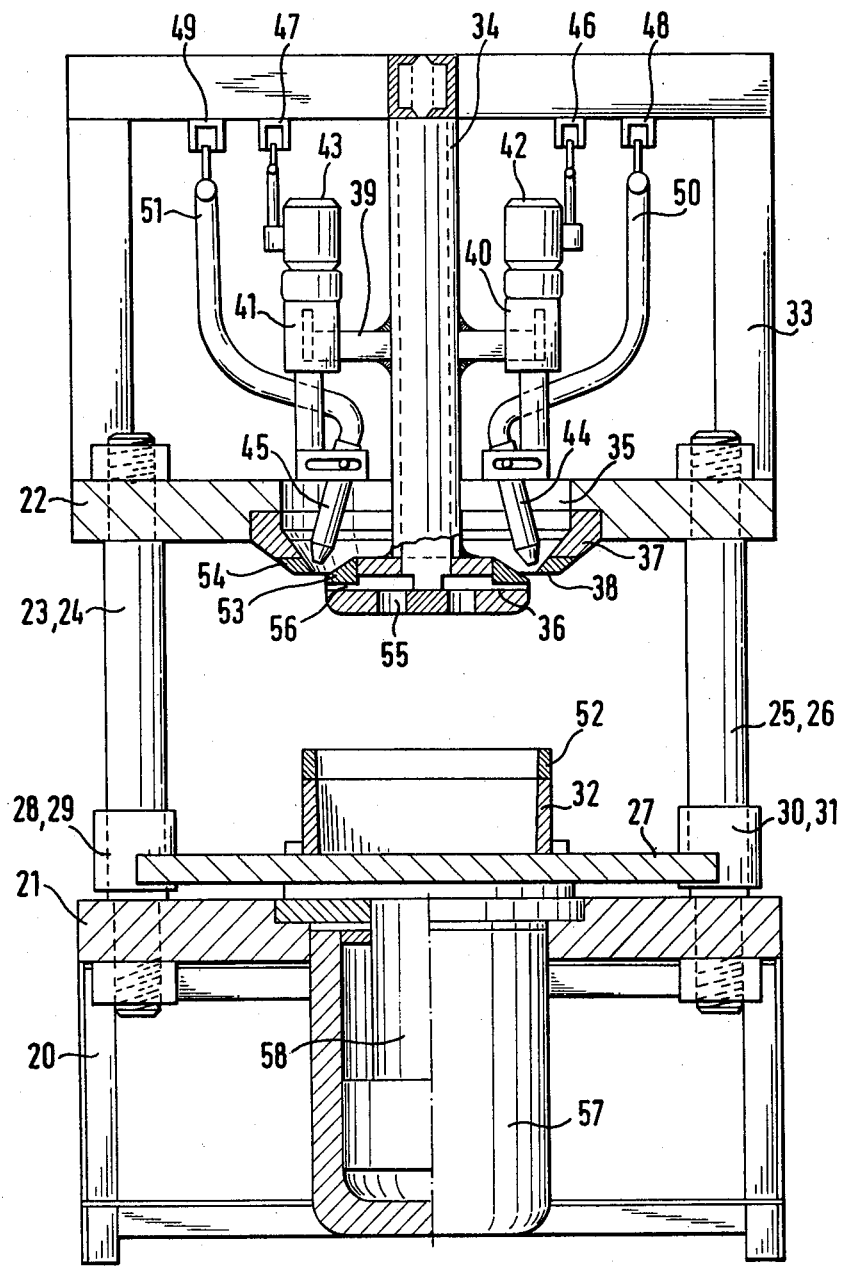
FIG. 3 shows apparatus for performing the method according to the invention.

The apparatus for performing the method according to the invention is illustrated in FIG. 3 in a partly sectional side view. In accordance therewith, a machine frame 20 has a lower cross-head 21 and an upper cross-head 22 which are connected together by four vertical guide columns 23 to 26 provided at the corners. A presser plate 27 with guide bushes 28 to 31 is displaceable on the guide columns, and a holder 32 for the basin to be welded is fixed in the center thereof in a releasable and thus interchangeable manner.

A cross yoke 33 is located on the upper cross-head 22, and a support column 34 which is attached there centrally in respect of the basin holder 27 extends from its upper center vertically downwardly through an opening 35 of the upper cross-head 22. The lower end of the support column 34 has a plunger 36 attached thereto the peripheral contour of which corresponds to the inner cross-section of the basin to be welded as well as the basin opening of the cover plate. Equidistantly in relation to this peripheral contour, a presser ring 37 is releasably and thus interchangeably fixed to the underside of the upper cross-head 22; the lower end face 38 of the presser ring 37 is set back relatively to the end face of the plunger 36.

Above the upper cross-head 22, the column 34 supports a guide track 39 the surrounding contour of which is again equidistant from the inner contour of the basin to be welded. Torch carriages 40 and 41 are each displaceable on the guide track 39 through an arc of more than 180°; their drive is effected by preferably steplessly controllable motors 42 and 43, and they carry at the bottom in an adjustable manner torches 44 and 45 for the performance of the welding process. 46 and 47 indicate the connections for the motors 42 and 43, whereas 48 and 49 denote the connections for pipe lines 50 and 51 through which the inert gas is supplied to the torches 44 and 45.

The basin holder 32, the plunger 36 as well as the presser ring 37 are reinforced in their regions approaching the weld seam by special inserts 52, 53 and 54 which may be water-cooled in a manner not illustrated. Moreover, compressed air may be supplied through the cavity of the support column 34 in a manner likewise not illustrated in detail; the compressed air leaves the plunger 36 through axial openings 55 and radial openings 56.

The vertical displacement of the presser plate 27 is effected by a cylinder-piston unit 57 which is attached to the lower cross-head 21 and the piston rod 58 of which extends through an opening of the cross-head and is attached to the underside of the presser plate 27.

Figure 4:
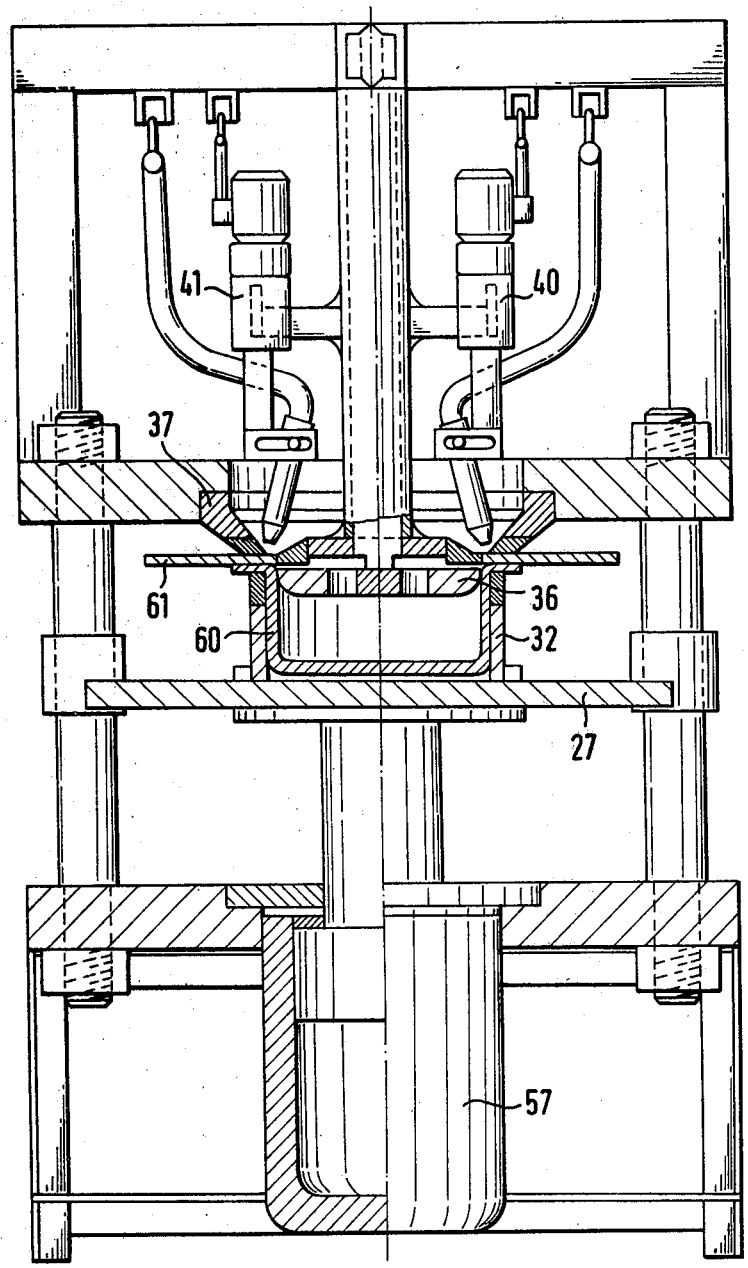
FIG. 4 shows the apparatus according to FIG. 3 with a workpiece inserted therein, in operation.

FIG. 4 illustrates once again the apparatus according to FIG. 3, now however during the welding process in which a basin 60 inserted in the basin holder 32 is welded to a cover plate 61 for a sink unit. For this purpose, the cover plate 61 is placed in a manner not illustrated in detail on the plunger 36 from below by its basin opening and against the presser ring 37, and by actuation of the cylinder-piston unit 57 the presser plate 27 as well as the basin holder 32 and thus the inserted basin 60 are then pressed from below against the cover plate 61. Thereby, the basin 60 and the cover plate 61 are centered one relative to the other.

After the termination of the welding process during which each of the torch carriages 40, 41 travels through an arc of slightly more than 180°, the presser plate 27 is lowered again, and after removal of the finished workpiece, the workpieces for the next following welding process may be inserted, whereupon then the torch carriages 40 and 41 travel back again through an arc of slightly more than 180° into the original position, for the next following welding process.

Figure 5:
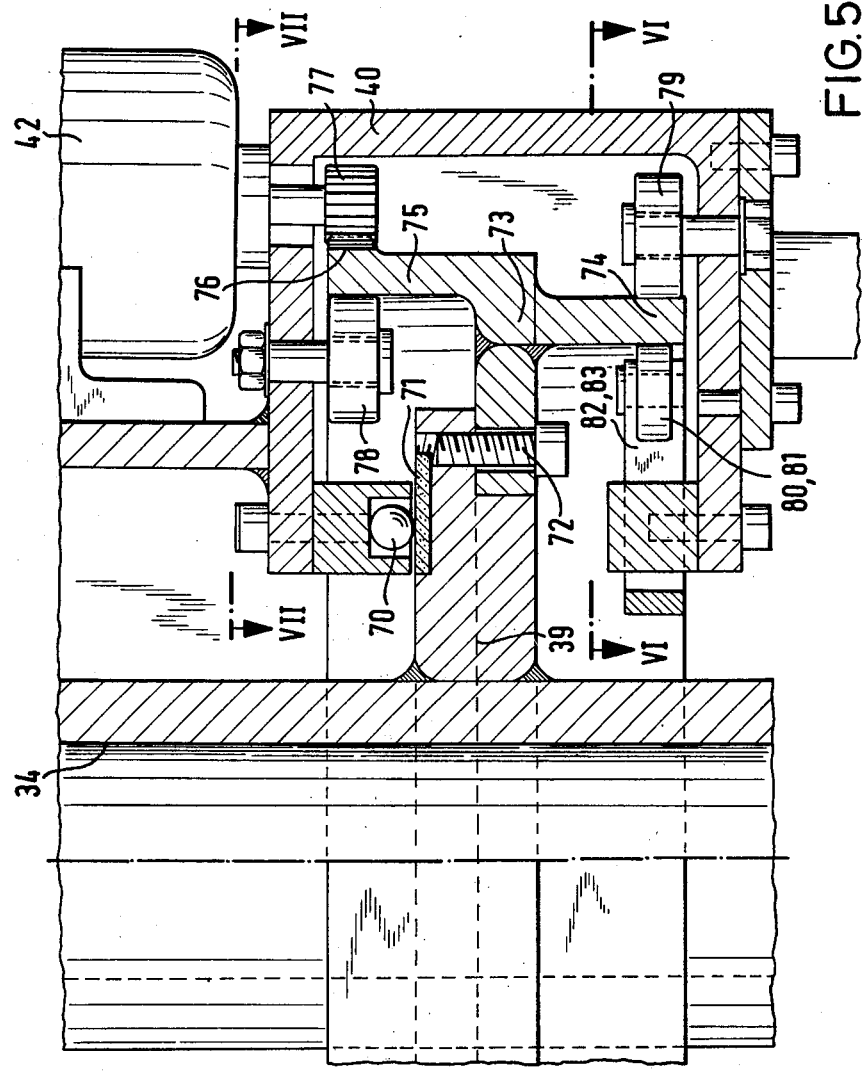
FIG. 5 is a view in section of the guide tracks for the welding torch of FIGS. 3 and 4.
Figure 6:
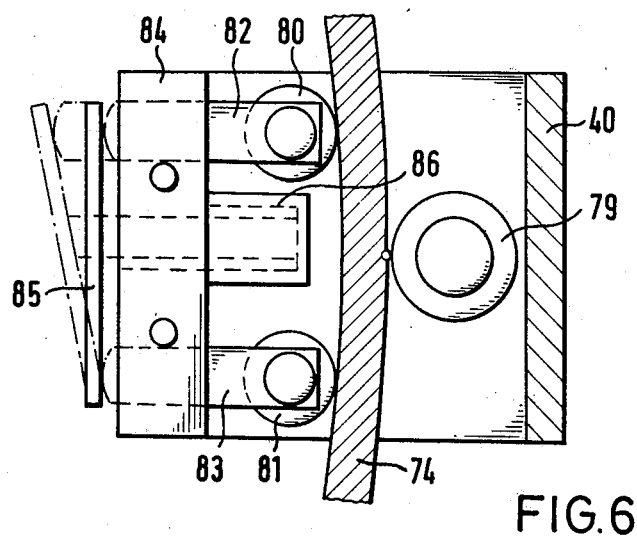
FIG. 6 is a view in section on the line VI—VI in FIG. 5.
Figure 7:
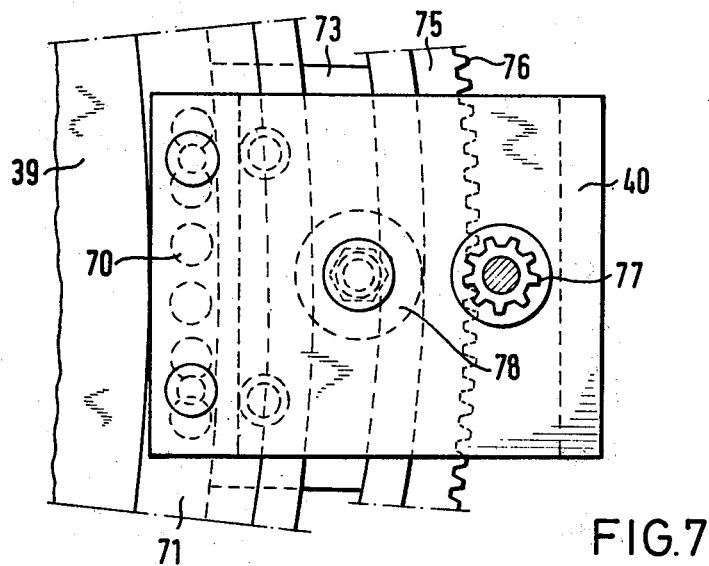
FIG. 7 is a view in section on the line VII—VII in FIG. 5.

FIGS. 5 to 7 illustrate in extracts and various sectional representations the guide track 39 attached to the support column 34, with the torch carriage 40 placed thereon. It may be seen therefrom that the torch carriage 40 is axially supported by means of balls 70 on a surrounding rolling surface 71. The radial support is effected by means of a ring 73 which is releasably and thus interchangeably attached by means of screws 72 and which has a surrounding rail 74 extending vertically downwardly and a surrounding rail 75 extending vertically upwardly. On its outer side the rail 75 has a surrounding toothed crown 76 which meshes with the pinion 77 of the motor drive 42. As a counterbearing therefor a roller 78 runs on the inside of the rail 75 and is adjustably fixed to the torch carriage 40.

The radial guidance at the lower rail 74 occurs on the outside by means of a roller 79 which is adjustably attached to the torch carriage 40, and on the inside by means of two rollers 80 and 81 which are rotatably mounted at the forward end of radially displaceable holders 82 and 83. The holders 82, 83 are radially displaceable in a bridge 84 fixed to the torch carriage and are pressed by a rocker 85 in the direction of the inside of the rail 74 in a manner not illustrated in detail by means of a presser spring 86 supported on the bridge 84.

Figure 8:
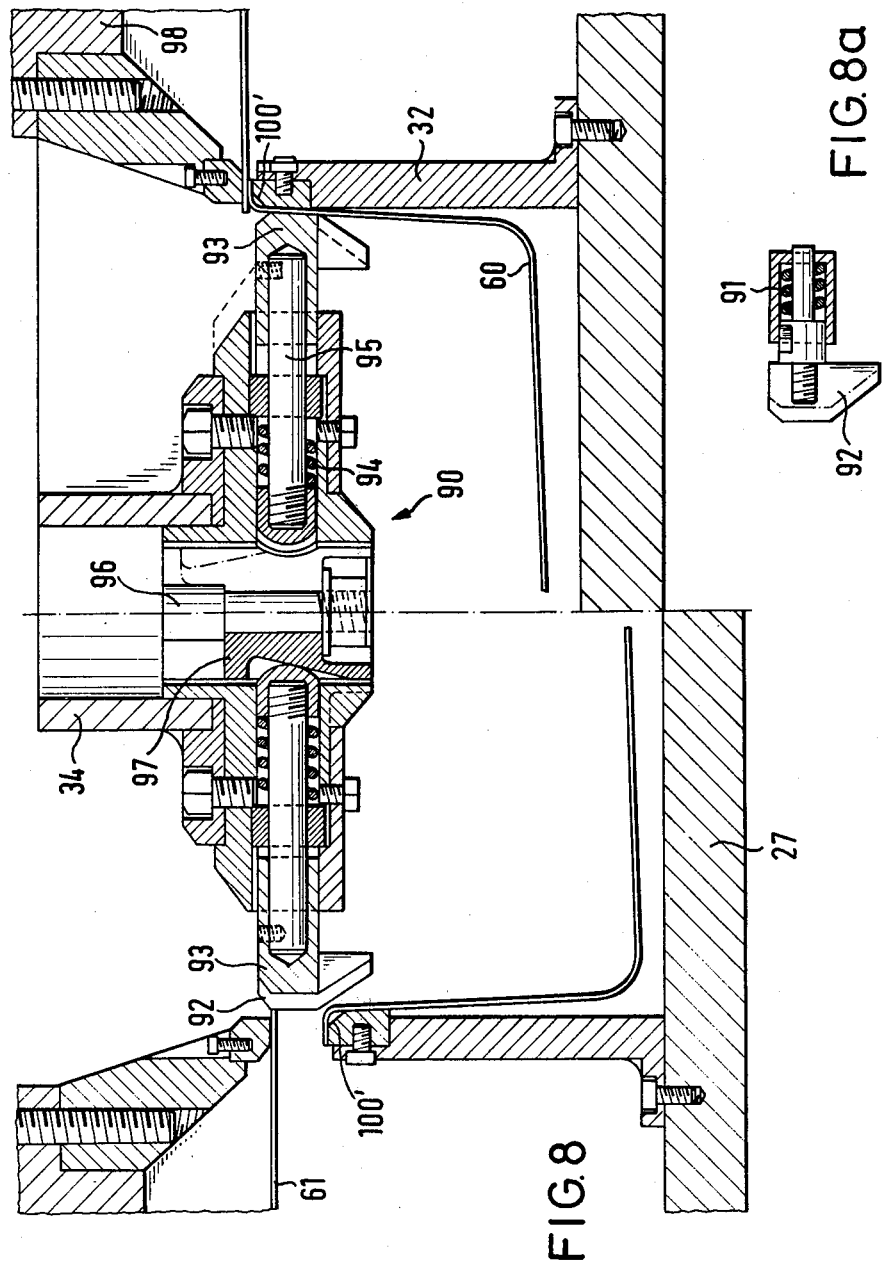
Figure 9:
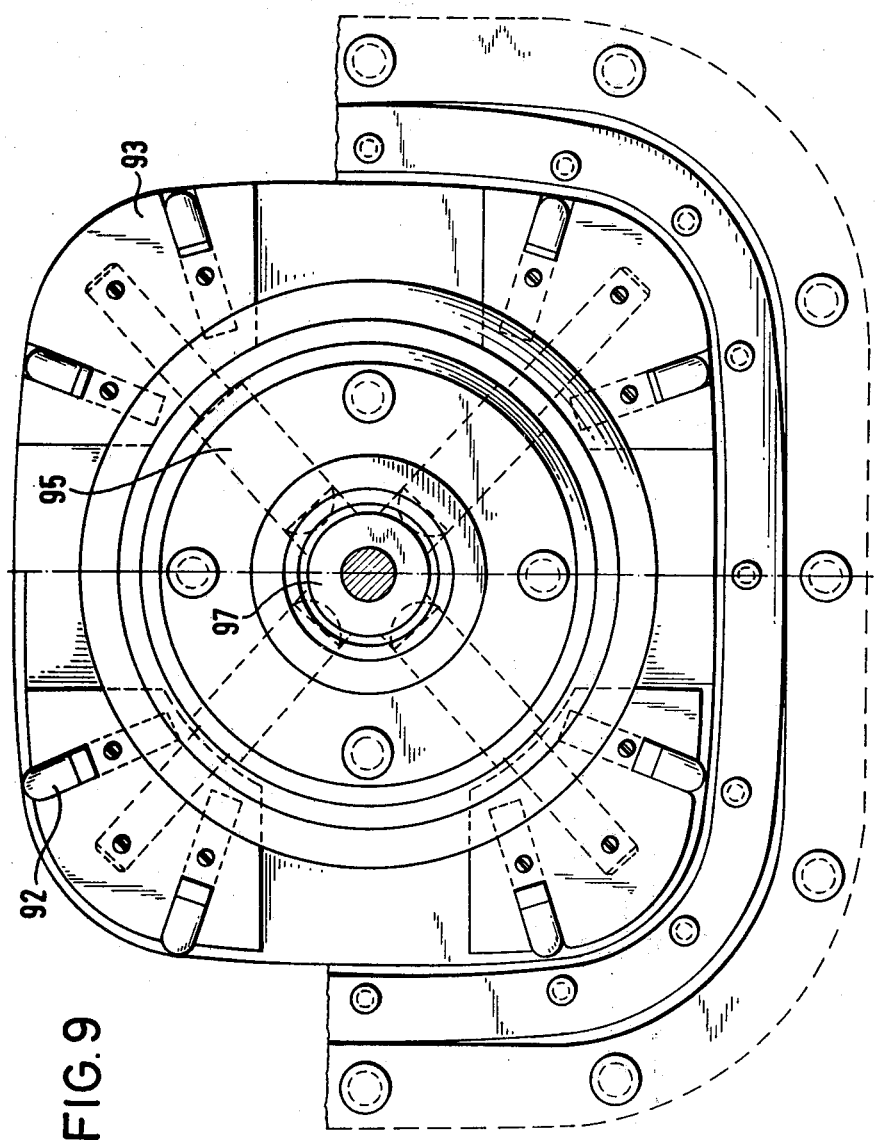
FIG. 9 is a view from below of the tools according to FIG. 8.
Figure 10:
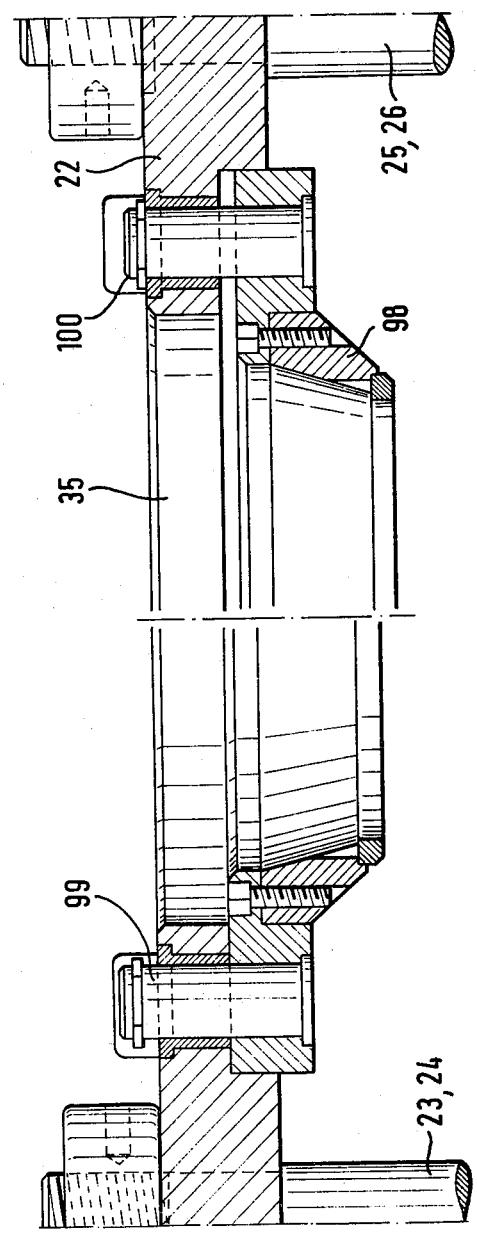
FIG. 10 is the presser ring according to FIG. 8 in a more complete illustration.

FIGS. 8 to 10 illustrate a tool further developed for the apparatus according to FIGS. 2 to 7, wherein parts occurring again are provided with the reference numerals previously present.

According to FIGS. 8 and 9, a plunger 90 located at the bottom of the support column 34 supports along its peripheral contour a plurality of centering pins 92 which, under the effect of springs 91 (see FIG. 8a), project horizontally beyond the peripheral contour for the basin opening of the cover plate 61, the centering pins being arranged to be pressed back into the peripheral contour of the plunger against the effect of the springs. On the other hand, the peripheral contour of the plunger 90 is formed at least partly, in the present case above all in the corner regions of the basin contour, by horizontally displaceable segments 93, the centering pins 92 in the present case being arranged in the segments 93. The segments may be extended against the force of compression springs 94 by means of actuator members 95, this being effected by means of a rod 96 which is vertically displaceable in the center of the support column 34 and which carries a cone 97 at its lower end.

The presser ring 98 which is illustrated merely partially in FIGS. 8 and 9 is illustrated in its totality on a reduced scale in FIG. 10. As may be seen therefrom, the presser ring 98 is vertically displaceable by a certain amount at the upper cross-head by means of pins 99, the upper limit position of its vertical displacement being its abutment against the upper cross-head (left half of FIG. 10), whereas its lower limit position of the displacement movement is formed by abutment rings 100 of the pins 99.

The apparatus thus described operates as follows:
With the tool (FIG. 8, left half) open for the insertion of the workpieces to be welded together, the presser ring 98 is located in its lower displacement position (see also FIG. 10, right half). In this position the lower edge of the presser ring 98 is located below the upper edges of the centering pins 92 as well as the segments 93. When then a coverplate 61 is placed from below over the plunger 90 against the presser ring 98, their correct centering is effected automatically by the centering pins 92.

When then the presser plate 27 together with the basin 60 inserted in the holder 32 is raised, the upper horizontal basin rim travels initially from below against the cover plate 61. Upon continuation of this movement, the coverplate 61 together with the presser ring 98 is lifted to the position illustrated in the right half of FIG. 8, whereby the coverplate 61 is released from the centering pins 92. This movement comes to the end when the presser ring is located at the top in abutment with the upper cross-head 22.

Shortly before the termination of this movement or after the termination of this movement, the rod 96 is then pulled upwards out of the position illustrated in the left half of FIG. 8, whereby the cone 97, by way of the actuator members 95, pushes the segments 93 outwards against the effect of the springs 94. This movement comes to an end when the basin rim is securely clamped between the segments 93 and the basin holder 32, whereby the upper peripheral contour of the basin is accurately aligned between these tools.

Thereupon the welding process described previously can take place without hindrance since, as may be seen from FIG. 8, right half, the region to be welded is now located above the upper edge of the centering pins 92 and the segments 93, that is to say in a freely accessible state.

When the welding process is terminated, the rod 96 is first displaced downwards again, so that the segments 93 are released from the basin by the effect of the springs 94. Thereupon the presser plate 27 is lowered in order to remove the finished workpiece. Thereby the presser ring 98 is also displaced again by its own weight into its lower position illustrated in the right half of FIG. 10.

Figure 11:
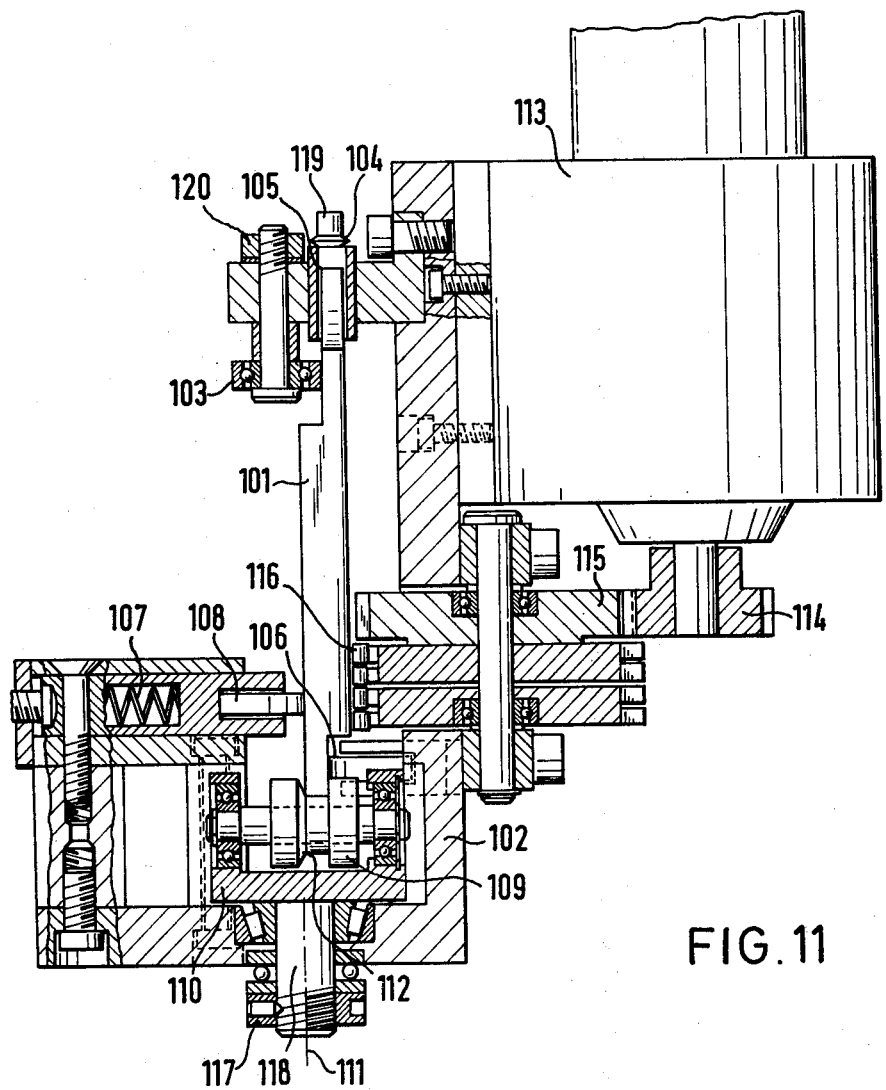
FIG. 11 is a view in section of another construction of the guide track for the welding torch of FIGS. 3 and 4.
Figure 12:
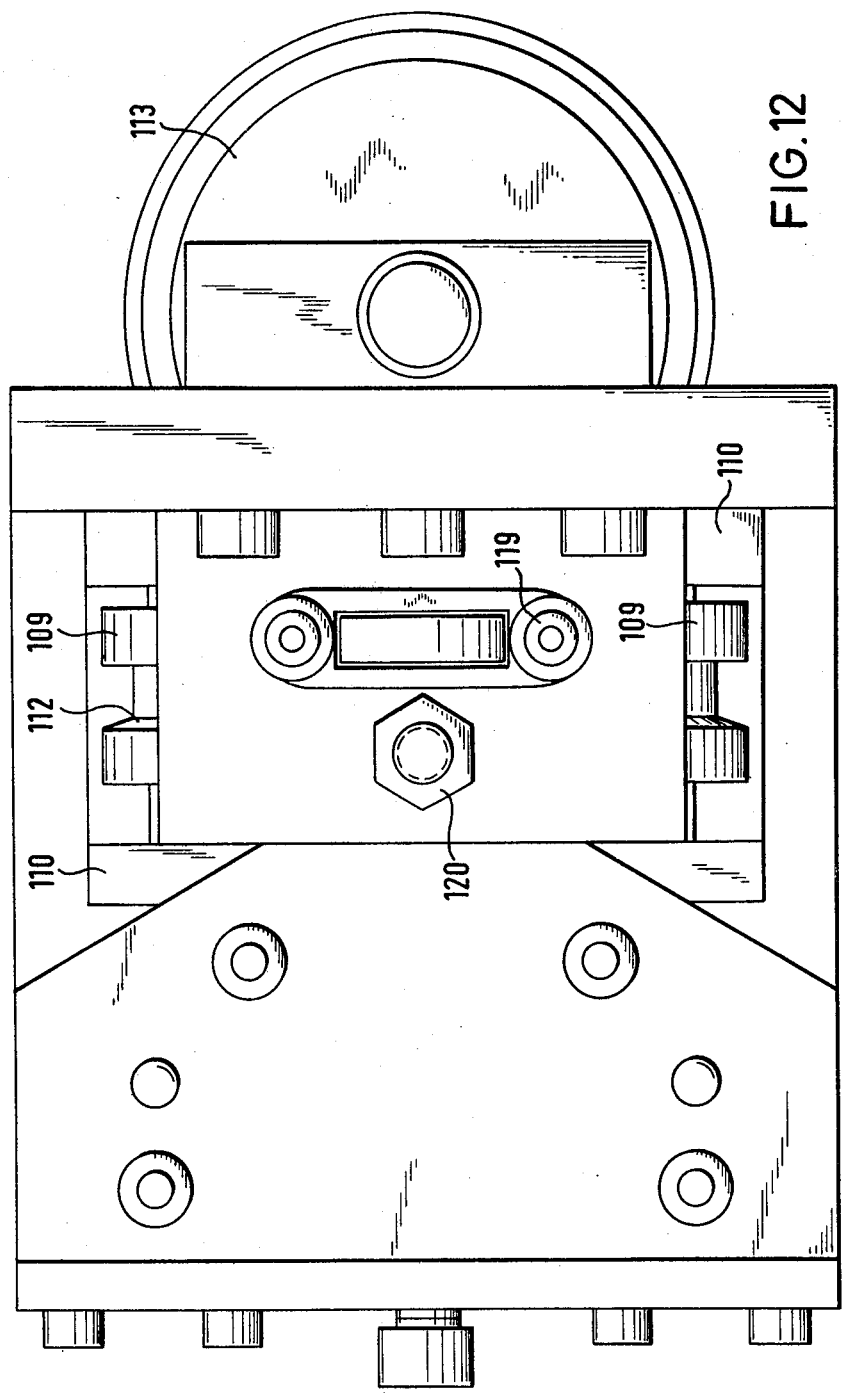
FIG. 12 is a view from above of the subject according to FIG. 11.

Moreover, there may be seen in FIG. 8 bevels 100 at the upper inner edge of the basin holder 32, the bevels being located in the region of the weld seam to be performed, and providing the possibility that the material liquified during the welding process can escape downwardly so that a smooth rounding may be produced possibly more easily on the upper surface visible later on. The constructional form according to FIGS. 11 and 12 demonstrates in FIG. 11 a guide track 101 which, similar to the example of FIG. 5, may be connected to the support column 34 by a horizontal rail. The torch carriage 102 is displaceable on the guide track 101. For this purpose, the torch carriage possesses at the upper end of the rail 101 in the interior of the guide track a securely adjustable roller 103 for the radial guidance, and two rollers 105 which are vertically resiliently mounted by means of springs 104. On the other hand, the torch carriage is provided on the outside with a securely adjusted roller 106 and on the inside two rollers 108 resiliently mounted by means of springs 107 similar to the example illustrated in FIG. 6, for guidance at the lower end of the rail. For the lower vertical guidance, there serve two support rollers 109. These are axially displaceably mounted in a rotary bogie 110 which is rotatable about a vertical axis 111, but is not axially displaceable in the torch carriage 102. The support rollers 109 have a circumferential groove by means of which they embrace the guide track 101 at the bottom. In this case, the substantially radial flank 112 of the circumferential groove which is arranged on the inside on the guide track, is bevelled in the manner of a rail wheel.

The drive of the torch carriage, starting from the motor 113, is effected by roller chains 116 by way of a reduction gear 114, 115. In the illustrated example, but not visible therein, the torch is located by means of a clamping connection 117 on the pin 118 of the bogie 110, the pin being rotatable about the axis 111.

During the travel of the torch carriage 102, the rotary bogie 110 with the support rollers 109 follows the contour of the guide track 101, the axial displaceability of the support rollers 109 being provided by corresponding axial displaceability of their end-wise mounting in the rotary bogie 110. Therefore, the vertical counterbearing of the support rollers 109 mounted in the rotary bogie 110 does not influence the displacement of the torch carriage 102 on the guide track 101. In contrast, the displaceability of the torch carriage is determined by the remaining rollers in respect of the contour to be travelled over. In this case, the vertical bias tension due to the springs 104 can be adjusted by means of tensioning screws 119, whereas the position of the roller 103 is determined by means of a clamping screw 120.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Apparatus for connecting at least one metal sheet basin to a metal sheet frame by electric arc welding comprising:
   (a) a machine frame, said machine frame having vertical guides connected together at upper and lower ends by a respective cross-head;
   (b) a presser plate displaceably mounted on said guides and having a basin holder fixed thereon for receiving a basin to be welded thereover;
   (c) a yoke located on the upper end cross-head;
   (d) a support column extending downwardly from said yoke and positioned centrally with respect to said basin holder, said support column extending through an opening in the upper end cross-head;
   (e) a plunger arranged on the lower end of the support column, said plunger having peripheral contours corresponding to the inner cross-section of a basin and a basin opening of a sheet frame to be joined for mutually centering the basin and basin opening;
   (f) a presser ring attached to the underside of the upper end cross-head, the lower end of which is flush with an upper edge of the basin holder, set back relative to a lower end face of the plunger and which surrounds the plunger forming an equidistant gap therebetween necessary for effectuating welding of said basin to said sheet frame;
   (g) a guide track mounted surrounding said support column above the upper end corss-head; and
   (h) at least one welding torch mounted so as to be displaceable along said guide track, said torch having a nozzle directed at a constant setting angle toward said gap between the plunger and the presser ring.

2. Apparatus according to claim 1, wherein the vertical guides comprise four guide columns which connect together corners of the cross-heads and wherein the presser plate displaceably mounted thereto is connected to said guide and columns by guide bushes.

3. Apparatus according to claim 1 or 2, comprising a cylinder-piston unit attached to the lower end crosshead for vertical displacement of the presser plate and the basin holder, said piston-cylinder unit having a piston rod extending through an opening of the cross-head and being connected to the underside of the presser plate.

4. Apparatus according to claim 1, wherein the basin holder is constructed as a hollow cylinder, the inner cross-section of which corresponds to the outer cross-section of the basin and on the upper rim of which lies, in use, the horizontal rim of the basin.

5. Apparatus according to claim 1 or 4, wherein the basin holder is releasably and thus interchangeably fixed on the presser plate.

6. Apparatus according to claim 1 or 4, wherein the basin holder is releasably and thus interchangeably fixed on the presser plate.

7. Apparatus according to claim 6, wherein a bevel is provided at an upper inner edge of the basin holder for spacing said basin holder to the material of the basin to be welded in the region of the weld seam to be formed.

8. Apparatus according to claim 1, wherein the plunger and the guide track is releasably and thus interchangeably fixed to the support column.

9. Apparatus according to claim 1 or 8, wherein the peripheral contour of the plunger is formed at least partly by horizontally displaceable segments, spring means for biasing said segments inwardly, and actuating means for displacing said segments, when the basin has been pushed up on the plunger, into an extended position against force applied by said spring means for forming the peripheral contour of the plunger.

10. Apparatus according to claim 1 or 8, wherein the plunger, along its peripheral contour, comprises a plurality of centering pins and spring which project said centering pins horizontally beyond the peripheral contour, said centering pins being pressable back into the peripheral contour of the plunger against the effect of the springs.

11. Apparatus according to claim 10, wherein the peripheral contour of the plunger is formed at least partly by horizontally displaceable segments, spring means for biasing said segments inwardly, and actuating means for displacing said segments, when the basin has been pushed up on the plunger, into an extended position against force applied by said spring means for forming the peripheral contour of the plunger.

12. Apparatus according to claim 11, wherein the segments are supported at least indirectly by the spring means acting on said actuating means, said actuating means comprising an actuator member which is vertically displaceable in the center of the support column and the plunger, said actuating member having a support surface that is conical.

13. Apparatus according to claim 11, wherein the centering pins are disposed in the segments.

14. Apparatus according to claim 12, wherein the centering pins are disposed in the segments.

15. Apparatus according to claim 1, wherein the presser ring is releasably and thus interchangeably fixed to the upper cross-head.

16. Apparatus according to claim 1 or 2, comprising a lost motion coupling interconnecting said upper end cross-head and said presser ring, the presser ring being vertically downwardly displaceable relative to said upper end cross-head a fixed amount by the force exerted upon it by the basin holder.

17. Apparatus according to claim 16, characterized in that the downward displacement of the presser ring occurs by its inherent weight.

18. Apparatus according to claim 13, characterized in that when the presser ring is in the secure counter-bearing position, upwardly displaced relative to said upper and cross-head, the lower edge thereof is located above the centering pins and the segments.

19. Apparatus according to claim 1, comprising a motor drive for said welding torch, said motor drive including a motor, a drive pinion connected to said motor, and a driveable member associated with said guide track in driveable connection with said drive pinion; and a torch carriage mounted so as to be vertically and horizontally guided by said guide track relative to said basin at a constant setting angle, said motor drive and welding torch being attached to said torch carriage.

20. Apparatus according to claim 19, characterized in that the motor drive of the welding torch is steplessly controllable.

21. Apparatus according to claim 19, wherein said driveable member is a toothed crown.

22. Apparatus according to claim 21, wherein the horizontal guidance for the welding torch provided by said guide track is obtained by guidance means comprising a vertically upwardly and a vertically downwardly extending surrounding rail of the guide track, the torch carriage being guided at the upwardly extending rail on the outside by the drive pinion and on the inside by a securely adjustable roller, and the torch carriage being guided at the downwardly extending rail on the outside by a securely adjustable roller and on the inside by radially resiliently mounted rollers.

23. Apparatus according to claim 14, wherein said driveable member is a roller chain.

24. Apparatus according to claim 23, wherein the horizontal and vertical guidance of the torch carriage by the guide track is obtained by guidance means comprising a surrounding vertical rail, the torch carriage being guided at the upper end of the rail on the inside by a secondary roller and vertically by two downwardly resiliently mounted rollers, the torch carriage being guided at the lower end of the rail on the outisde by a securely adjustable roller and on the inside by two resiliently mounted rollers as well as vertically by two support rollers which embrace the lower end of the rail by a peripheral groove, the support rollers being mounted together axially displaceably in a bogie which is rotatable about a vertical axis on the torch carriage, an inwardly located substantially radial edge of the peripheral groove of the support rollers being chamfered in the manner of a rail wheel, and the torch being connected to the rotary bogie or the axis of rotation thereof.

25. Apparatus according to claim 19, characterized in that the torch is adjustably attached to the torch carriage.

26. Apparatus according to claim 1, wherein the welding torch comprises two burners, each of said burners being displaceable through an arc of more than 180°.

* * * * *